US010227487B2

(12) United States Patent
Cruz et al.

(10) Patent No.: US 10,227,487 B2
(45) Date of Patent: Mar. 12, 2019

(54) POLYOLEFIN ADDITIVE, A SAG RESISTANT POLYOLEFIN AND A METHOD OF PREPARING THE SAME

(71) Applicant: Rohm and Haas Company, Philadelphia, PA (US)

(72) Inventors: Carlos A. Cruz, Spring House, PA (US); Morris C. Wills, Spring House, PA (US)

(73) Assignee: Rohm and Haas Company, Collegeville, PA (US)

( * ) Notice: Subject to any disclaimer, the term of this patent is extended or adjusted under 35 U.S.C. 154(b) by 102 days.

(21) Appl. No.: 15/532,300

(22) PCT Filed: Nov. 29, 2015

(86) PCT No.: PCT/US2015/062863
§ 371 (c)(1),
(2) Date: Jun. 1, 2017

(87) PCT Pub. No.: WO2016/094092
PCT Pub. Date: Jun. 16, 2016

(65) Prior Publication Data
US 2017/0362426 A1 Dec. 21, 2017

Related U.S. Application Data

(60) Provisional application No. 62/088,734, filed on Dec. 8, 2014.

(51) Int. Cl.
*C08L 51/06* (2006.01)
*C08F 255/02* (2006.01)
*C08L 23/06* (2006.01)

(52) U.S. Cl.
CPC .......... *C08L 51/06* (2013.01); *C08F 255/023* (2013.01); *C08L 23/06* (2013.01)

(58) Field of Classification Search
CPC .... C08F 220/68; C08F 255/023; C08L 23/06; C08L 51/06
See application file for complete search history.

(56) References Cited

U.S. PATENT DOCUMENTS

| 4,767,823 A | 8/1988 | Jones et al. |
| 5,229,546 A | 7/1993 | Ilenda et al. |
| 5,264,315 A | 11/1993 | Tan et al. |
| 5,338,808 A | 8/1994 | Ghisolfi |
| 5,446,064 A | 8/1995 | Hori et al. |
| 6,784,246 B2 | 8/2004 | Cruz et al. |
| 6,875,802 B2 | 4/2005 | Cruz et al. |
| 7,763,692 B2 | 7/2010 | Tamai et al. |

FOREIGN PATENT DOCUMENTS

| EP | 1234841 | 8/2002 |
| EP | 1236750 | 9/2002 |
| JP | 3074673 | 8/2000 |
| WO | WO 00/18827 | 1/2008 |
| WO | WO2008/002952 | 1/2008 |

OTHER PUBLICATIONS

EP Office Action dated Aug. 17, 2017; from counterpart EP Application No. 15816581.1.
PCT Search Report dated Feb. 19, 2016; from PCT counterpart Application No. PCT/US2015/062863.
PCT IPRP dated Jun. 13, 2017; from PCT counterpart Application No. PCT/US2015/062863.
Chinese Office Action dated Jan. 9, 2019; from counterpart Chinese Application No. 201580063076.1.

*Primary Examiner* — Mark S Kaucher

(57) ABSTRACT

A polyolefin additive comprising chlorinated polyolefin grafted with an alkyl (meth)acrylate, wherein the alkyl has greater than 10 carbon atoms is provided. Further provided are a method for improving the sag resistance of polyolefins and sag resistant polyolefins.

15 Claims, No Drawings

POLYOLEFIN ADDITIVE, A SAG RESISTANT POLYOLEFIN AND A METHOD OF PREPARING THE SAME

FIELD OF INVENTION

The disclosure relates to a polyolefin additive, a sag resistant polyolefin and a method of preparing the same.

BACKGROUND OF THE INVENTION

Polyolefins (for example, polyethylene and polypropylene) are melt processed above their crystalline melting points. The melt strength of the polyolefin, if too low, may cause difficulty in melt processing processes, such as thermoforming and blow molding. Low melt strength is exhibited as sag or drool.

Sag is a surrogate measurement that relates to both melt elasticity and melt strength. Good sag resistance is conducive to enhancement of thermoformability in plastics (J.L. Throne, Technology of Thermoforming, Hanser-Gardner Publications, Inc., Cincinnati Ohio, 1996). Several approaches to produce melt-strength have been developed over the years. Irradiating polypropylene to obtain long-chain branching and, consequently, high melt strength, has been commercialized. This method involves careful control of the irradiation process and may lead to the undesirable production of gels. Treatment of LLDPE with organic peroxides is another route to obtain a polyolefin with high melt strength although, as in the irradiation case, the process involves a chemical reaction that must be closely controlled to produce the desired effect.

Alternatively, additives have been used to improve melt strength, such as Mitsubishi Rayon's A-3000 which is a commercial product based on an acrylic polymer and polytetrafluoroethylene (PTFE). Chemically modified LLDPE, as is the case of DuPont's BOOSTER, is another example of the additive approach to enhance melt strength in polyolefins. Long-chain acrylic monomers as additives to improve melt strength have been used but the synthetic route to obtain such additives is cumbersome.

SUMMARY OF THE INVENTION

The disclosure is for a polyolefin additive, a sag resistant polyolefin and a method of preparing the same.

In one embodiment, the disclosure provides a polyolefin additive comprising chlorinated polyolefin grafted with an alkyl (meth)acrylate, wherein the alkyl has greater than 10 carbon atoms. The disclosure further provides a method of improving the sag resistance of an olefin-based polymer and a sag resistant polyolefin.

DETAILED DESCRIPTION OF THE INVENTION

The disclosure provides a polyolefin additive, a sag resistant polyolefin and a method of preparing the same.

In a first aspect, the disclosure provides a polyolefin additive comprising chlorinated polyolefin grafted with an alkyl (meth)acrylate, wherein the alkyl has greater than 10 carbon atoms.

In a second aspect, the disclosure provides a method of improving the sag resistance of an olefin-based polymer comprising adding from 1 to 5 wt % chlorinated polyolefin grafted with an alkyl (meth)acrylate (CPO-g-MA) to one or more polyolefins.

In a third aspect, the disclosure provides a sag resistant polyolefin composition comprising one or more polyolefins and from 1 to 5 wt % chlorinated polyolefin grafted with an alkyl (meth)acrylate, according to any embodiment disclosed herein.

As used herein, the term "chlorinated polyolefin", refers to an olefin-based polymer comprising one or more chlorine-containing comonomers; and/or an olefin-based polymer which is subject to a chlorination reaction, for example see chlorination reactions described in U.S. Pat. No. 7,763,692, U.S. Pat. No. 5,446,064, U.S. Pat. No. 4,767,823 and WO2008/002952.

Polyolefin or olefin-based polymer means a polymer having greater than 50 wt % units derived from one or more olefinic monomers.

Polyethylene or ethylene-based polymer means a polymer having greater than 50 wt % units derived from ethylene monomer.

(Meth)acrylate means acrylate, methacrylate, or combinations of acrylate and methacrylate. For example, the term methyl(meth)acrylate may mean solely methyl methacrylate, solely methyl acrylate or a combination of methyl methacrylate and methyl acrylate.

In one embodiment, the chlorinated polyolefin has a chlorine content of 15 to 40 wt %, based on the weight of the polymer. All individual values and subranges from 15 to 40 wt % chlorine content are included and disclosed herein; for example, the chlorine content can range from a lower limit of 15, 25 or 35 wt % to an upper limit of 20, 40 or 40 wt %. For example, the chlorine content can range from 15 to 40 wt %, or in the alternative, from 15 to 31 wt %, or in the alternative, from 30 to 40 wt %, or in the alternative, from 25 to 40 wt %, or in the alternative, from 35 to 40 wt %. Examples of olefin-based polymers for use in the production of chlorinated polyolefins include, but are not limited to, polypropylene-based polymers, such as, polypropylene homopolymers, propylene-ethylene interpolymers and propylene-alpha-olefin interpolymers and propylene-ethylene copolymers and propylene-alpha-olefin copolymers; and ethylene-based polymers, such as, polyethylene homopolymers, ethylene-alpha-olefin interpolymers and ethylene-alpha-olefin copolymers.

Examples of alpha-olefins in propylene-α-olefin copolymers include ethylene or $C_4$-$C_{20}$ alpha-olefins, such as ethylene, 1-butene, 1-pentene, 1-hexene, 1-heptene, 1-octene, 1-decene, 1-dodecene, 1-hexadecene, 4-methyl-1-pentene, etc., among which ethylene is preferable.

Examples of alpha-olefins in ethylene-alpha-olefin copolymers include $C_{3-20}$ α-olefins, such as propylene, 1-butene, 1-pentene, 1-hexene, 1-heptene, 1-octene, 1-decene, 1-dodecene, 1-hexadecene, and 4-methyl-1-pentene. Preferably, the alpha-olefin is a $C_3$-$C_8$ alpha-olefin. In one embodiment, the chlorinated olefin-based polymer has a weight average molecular weight, Mw, from 25,000 to 125,000 g/mole. All individual values and subranges from 25,000 to 125,000 are included and disclosed herein; for example, the Mw can be from a lower limit of 25000, 50000, 75000, or 100000 g/mole to an upper limit of 50000, 75000, 100000, or 125000. For example, the Mw can be from 25000 to 125000, or in the alternative, from 25000 to 75000, or in the alternative, from 75000 to 125000, or in the alternative, from 50000 to 100000.

The chlorinated polyolefin is grafted with an alkyl (meth)acrylate, wherein the alkyl has greater than or equal to 10 carbon atoms. The alky (meth)acrylate may be one or more alkyl (meth)acrylates, wherein each alkyl has greater than or equal to 10 carbons. Exemplary alkyl (meth)acrylates which may be grafted onto the chlorinated polyolefin include, but are not limited to, lauryl (aka, dodecyl) methacrylate, stearyl (also known as octadecyl) methacrylate, hexadecyl methacrylate, lauryl acrylate, and stearyl acrylate.

Methods of grafting alkyl (meth)acrylate onto chlorinated polyolefins are known in the art, for example, those methods disclosed in U.S. Pat. No. 5,338,803, the disclosure of which is incorporated herein in its entirety. The alkyl grafted chlorinated polyolefins useful in embodiments of the present disclosure may be made according to any process.

The disclosure further provides a polyolefin additive, a sag resistant polyolefin and method of making the same in accordance with any embodiment disclosed herein, except that the alkyl (meth)acrylate is selected from the group consisting of lauryl methacrylate, stearyl methacrylate and a combination thereof.

The disclosure further provides a polyolefin additive, a sag resistant polyolefin and method of making the same in accordance with any embodiment disclosed herein, except that the chlorinated polyolefin grafted with an alkyl (meth) acrylate is one or more selected from the group consisting of lauryl methacrylate grafted chlorinated polyethylene (CPE-g-LMA) and stearyl methacrylate grafted chlorinated polyethylene (CPE-g-SMA).

The disclosure further provides a polyolefin additive, a sag resistant polyolefin and method of making the same in accordance with any embodiment disclosed herein, except that the chlorinated polyolefin grafted with an alkyl (meth) acrylate comprises from 20 to 60 wt % chlorinated polyolefin and from 40 to 80 wt % alkyl (meth)acrylate. All individual values and subranges from 20 to 60 wt % chlorinated polyolefin are included and disclosed herein; for example, the amount of chlorinated polyolefin can range from a lower limit of 20, 30, 40, 45, 50 or 55 wt % to an upper limit of 25, 29, 33, 38, 43, 48, 51, 54, 57, or 60 wt %. For example, the amount of chlorinated polyolefin can be from 20 to 60 wt %, or in the alternative, from 20 to 45 wt %, or in the alternative, from 50 to 60 wt %, or in the alternative from 35 to 55 wt %. Likewise, all individual values and subranges from 40 to 80 wt % alkyl (meth) acrylate in the chlorinated polyolefin grafted with an alkyl (meth)acrylate are included and disclosed herein; for example, the amount of alkyl (meth)acrylate can range from a lower limit of 40, 45, 50, 55, 60, 65, 0 or 75 wt % to an upper limit of 43, 48, 51, 54, 57, 60, 65, 75, or 80 wt %. For example, the amount of alkyl (meth)acrylate can range from 40 to 80 wt %, or in the alternative, from 40 to 60 wt %, or in the alternative, from 50 to 80 wt %, or in the alternative from 45 to 75 wt %.

In the method of the present disclosure, from 1 to 5 wt % chlorinated polyolefin grafted with an alkyl (meth)acrylate is added to one or more polyolefins. All individual values and subranges from 1 to 5 wt % are included and disclosed herein; for example, the amount of chlorinated polyolefin grafted with an alkyl (meth)acrylate can range from a lower limit of 1, 1.5, 2, 2.5, 3, 3.5, 4, or 4.5 wt % to an upper limit of 1.25, 1.75, 2.25, 2.75, 3.25, 3.75, 4.25, 4.75 or 5 wt %. For example, the amount of chlorinated polyolefin grafted with an alkyl (meth)acrylate added to one or more polyolefins can range from 1 to 5 wt %, or in the alternative, 1 to 3 wt %, or in the alternative, from 3 to 5 wt %, or in the alternative, from 2 to 4 wt %, or in the alternative, from 1.25 to 3.75 wt %.

The disclosure further provides a polyolefin additive, a sag resistant polyolefin and method of making the same in accordance with any embodiment disclosed herein, except that the one or more polyolefins to which the CPO-g-MA is added are selected from the group consisting of polypropylene, high density polyethylene, and linear low density polyethylene.

As used herein, linear low density polyethylene (HDPE) means an ethylene/alpha-olefin copolymer having a density equal to or less than 0.95 g/cc which is substantially free of long chain branching.

As used herein, high density polyethylene means an ethylene homopolymer having a density greater than 0.93 g/cc and exhibiting no branching.

As used herein, polypropylene means any polymer comprising more than 50 wt % units derived from propylene, including propylene homopolymers and propylene copolymers.

EXAMPLES

The following examples illustrate the present invention but are not intended to limit the scope of the invention. Abbreviations used herein include:
ALMA allyl methacrylate
BOP based on total polymer
LLDPE linear low density polyethylene
LMA lauryl methacrylate
SMA stearyl methacrylate
t-BPO t-butyl peroctoate, free radical initiator Production of Chlorinated Polyethylene Grafted with Stearyl Methacrylate Inventive CPE-g-SMA Example 1

Table 1 provides the components and amounts used in producing Inventive Example 1, chlorinated polyethylene grafted with stearyl methacrylate (CPE-g-SMA). Deionized water, TYRIN 7100, a chlorinated polyethylene commercially available from The Dow Chemical Company (Midland, Mich., USA), stearyl methacrylate (SMA) which is commercially available from Sigma-Aldrich Corporation (St. Louis, Mo., USA), allyl methacrylate (ALMA), a graft linking monomer which is commercially available from Sigma-Aldrich, and TRIGONOX 21S, a tert-butyl peroxy-2-ethylhexanoate free radical initiator which is commercially available from Akzo Nobel Chemicals (Pasadena, Tex., USA) were added together at 25° C. with mixing over ten minutes and allowed to sit with mixing for an additional 10 minutes. The mixture was then heated to 85° C. to initiate grafting polymerization and maintained at that temperature for two hours. The mixture was then heated to 95° C. and maintained at that temperature for one hour. The resulting slurry was then filtered and washed with water. The filtered solids were then dried.

TABLE 1

| Material | Active Ingredient % | Total Weight |
| --- | --- | --- |
| DI Water | 0% | 1590.15 |
| TYRIN 7100 | 54.2% | 276.75 |
| SMA | 100% | 149.93 |
| ALMA | 100% | 0.075 |
| TRIGONOX 21S | 97% | 3.09 |
| All materials | | 2020.00 |

Inventive CPE-g-LMA Example 2 was produced using the components and amounts shown in Table 2 and the same conditions used in connection with Inventive CPE-g-SMA Example 1.

TABLE 2

| Material | Active Ingredient % | Total Weight |
| --- | --- | --- |
| DI Water | 0% | 1590.15 |
| TYRIN 7100 | 54.2% | 276.75 |
| LMA | 100% | 149.93 |
| ALMA | 100% | 0.075 |
| TRIGONOX 21S | 97% | 3.09 |
| All materials | | 2020.00 |

The LMA was ROCRYL 320, which is commercially available from The Dow Chemical Company. ALMA is commercially available from Sigma-Aldrich Corp.

Inventive Sag Resistant Polyolefin Example 1 was produced by adding 2.5 wt %, based on total polymer weight, of Inventive CPE-g-SMA Example 1 to ELITE 5400G, a linear low density polymer commercially available from The Dow Chemical Company to form a polymer blend. The polymer blend was then milled, molded and cut into 0.5 by 5 by 0.04 inch test strips for sag resistance testing. The milling and molding conditions for preparation of sheets cut into sag resistance test strips was as follows: Polyethylene pellets were blended with modifier (150 grams total) and melt processed on an electric 2 roll mill (COLLIN Mill Type # WW 150 p). The mill temperature was set at 150° C. with the front roll mill speed at 26 RPM and the back at 21 RPM. The polymer blend was melt processed for a total time of 5 minutes. The sample was then place in a 1 mm (0.04 inch)×8.5 inch×10 inch mold and pressed in a RELIABLE press at 150° C. for 3 minutes at 15 tons and then 2 minutes at 45 tons. Cooling was accomplished under 45 tons for an additional 3-4 minutes. Samples were cut into test strips with dimensions of 1 mm (0.04 inch)×0.5 inch×5 inches.

Inventive Sag Resistant Polyolefin Examples 2-4 were produced by mixing 2.5 wt %, 5 wt % and 10 wt % based on the total polymer weight respectively of Inventive CPE-g-LMA Example 2 with ELITE 5400G and forming test sample strips as discussed above.

Comparative Polyolefin Example 1 was neat ELITE 5400G. ELITE 5400G is a polyethylene resin having a density of 0.916 g/cc and an $I_2$ of 1.0 g/10 min. which is commercially available from The Dow Chemical Company (Midland, Mich., USA);

Comparative Polyolefin Examples 2, 3 and 4 was ELITE 5400G mixed with 2.5 wt %, 5.0 wt %, and 10 wt %, respectively, of LMA-1, a spray dried lauryl methacrylate emulsion polymer. LMA-1 is produced according to the following procedure:

A conventional emulsion polymer with LMA as the core stage and a styrene and MMA shell is prepared with sodium persulfate as initiator and DISPONIL FES-32 as anionic surfactant. DISPONIL FES-32 is a fatty alcohol polyglycol ether sulphate, Na-salt, which is commercially available from BASF (Freeport, Tex.). The LMA to shell ratio is typically 70//30 by monomer weight. The final latex solids are typically about 48% with an average particle size of about 200 nm. The LMA stage contains about 0.05% ALMA which yields a branched, but un-crosslinked polymer structure having a weight average molecular weight of about 750,000 to 1 million Daltons. The latex is isolated to a powder by spray drying.

Inventive Sag Resistant Polyolefin Examples 1-4 exhibited less sag than either of Comparative Polyolefin Example 1, an unmodified LLDPE, and Comparative Polyolefin Example 2, LLDPE with the same loading of methacrylate additive. Each of Comparative Polyolefin Examples 3 and 4 had substantially higher loadings of methacrylate additive and exhibited comparable sag to Inventive Sag Resistant Polyolefin Example 1. At comparable additive levels, the Inventive Sag Resistant Polyolefin Examples 3 and 4 exhibit comparable sag to such additive levels of Comparative Polyolefin Examples 3 and 4.

Additional Inventive Sag Resistant Polyolefin Examples 5-10 were prepared by loading CPE-g-SMA Examples with varying the amount of SMA (20 wt %, 30 wt %, 40 wt %, 50 wt %, 60 wt %, and 80 wt % based on total polymer weight) grafted into the polymer. The CPE-g-SMA was loaded into ELITE 5230G at a level of 10 wt % based on total polymer. The method for producing these additional examples is the same as that described above except that no ALMA is used. Table 3 illustrates the sag in inches of test strips made from these Inventive Sag Resistant Polyolefin Examples 5-10. ELITE 5230G is an LLDPE with a density of 0.916 g/cc and an $I_2$ of 4.0 g/10 min, which is commercially available from The Dow Chemical Company. Comparative Polyolefin Example 5 was ELITE 5230G with 10 wt % TYRIN 7100. Comparative Polyolefin Example 6 was ELITE 5230G with 10 wt % LMA-1. Comparative Polyolefin Example 7 was ELITE 5230G with 10 wt % CPE-g-SMA which comprised 90 wt % CPE and 10 wt % SMA grafted onto the CPE. Comparative Polyolefin Example 8 was ELITE 5230G with 10 wt % SMA. As used herein, the term X-CPE-g-Y-SMA, wherein X and Y are numerals refers to a CPE-g-SMA having Xwt % units derived from CPE and Y wt % units derived from SMA.

TABLE 3

| | | Sag in inches | | | | |
| --- | --- | --- | --- | --- | --- | --- |
| Example | Additive | 1 min. | 2 min. | 3 min. | 4 min. | 5 min. |
| Comparative Polyolefin Example 5 | TYRIN 7100 | 0 | 5.00 | 5.00 | | |
| Comparative Polyolefin Example 6 | LMA-1 | 0 | 0.25 | 0.50 | 0.75 | 2 |
| Comparative Polyolefin Example 7 | 90 CPE-g-10 SMA | 0 | 5 | 5 | | |
| Inventive Sag Resistant Polyolefin Ex. 5 | 80 CPE-g-20 SMA | 0 | 1 | 5.00 | 5.00 | |
| Inventive Sag Resistant Polyolefin Ex. 6 | 70 CPE-g-30 SMA | 0 | 1.00 | 5.0 | | |
| Inventive Sag Resistant Polyolefin Ex. 7 | 60 CPE-g-40 SMA | 0 | 1.00 | 2.25 | 5.00 | |
| Inventive Sag Resistant Polyolefin Ex. 8 | 50 CPE-g-50 SMA | 0 | 0.13 | 1.8 | 5.00 | |

TABLE 3-continued

|  |  | Sag in inches | | | | |
| --- | --- | --- | --- | --- | --- | --- |
| Example | Additive | 1 min. | 2 min. | 3 min. | 4 min. | 5 min. |
| Inventive Sag Resistant Polyolefin Ex. 9 | 40 CPE-g-60 SMA | 0 | 0.50 | 1.00 | 5 | |
| Inventive Sag Resistant Polyolefin Ex. 10 | 20 CPE-g-80 SMA | 0 | −0.3 | −1 | −1 | −1.00 |
| Comparative Polyolefin Example 8 | 0 CPE-g-100 SMA | 0 | 0.0 | 1 | 1 | 2.25 |

Inventive Sag Resistant Polyolefin Example 11 was produced by loading 10 wt % Inventive CPE-g-SMA Example 2 into ELITE 5400G. Inventive CPE-g-SMA Example 2 was produced according to the procedure described above except that the initiator was lauroyl peroxide and the SMA content was 30 wt % based on the total polymer weight. Inventive Sag Resistant Polyolefin Examples 12 and 13 were produced by loading 10 wt % of CPE-g-SMA-12 and CPE-g-SMA-13, each having 30 wt % units derived from SMA content, into ELITE 5400G, respectively. Each of these CPE-g-SMA-12 and -13 were produced using a chlorintated polyethylene having a chlorine content 25 wt %. The chlorinated polyethylene used to make CPE-g-SMA-12 has a more random chlorine distribution that the chlorinated polyethylene used to make CPE-g-SMA-13. The sag testing results are given in Table 4.

TABLE 4

|  |  | Sag in inches | | | | |
| --- | --- | --- | --- | --- | --- | --- |
| Example | Additive | 1 min. | 2 min. | 3 min. | 4 min. | 5 min. |
| Inventive Sag Resistant Polyolefin Ex. 11 | Inventive CPE-g-SMA Example 2 | 0 | 0.25 | 0.75 | 1.75 | 2.75 |
| Inventive Sag Resistant Polyolefin Ex. 12 | CPE-g-SMA-12 | 0 | 0.13 | 0.25 | 1.00 | 1.50 |
| Inventive Sag Resistant Polyolefin Ex. 13 | CPE-g-SMA-13 | 0 | 0.13 | 0.13 | 1.25 | 0.25 |

Certain CPO-g-MAs were also tested as an additive, at a loading of 10 wt % based on total polymer weight, to a high density polyethylene, CONTINUUM DGDA 2490NT, which is commercially available from The Dow Chemical Company. No effect was seen in HDPE except at the 10 wt % additive loading. Table 5 provides the Modified Sag results for 10 wt % CPE-g-SMA (at 30 wt %, 50 wt % and 80 wt % SMA).

TABLE 5

|  |  | Sag in Inches | | | | |
| --- | --- | --- | --- | --- | --- | --- |
| Example | Additive | 1 min. | 2 min. | 3 min. | 4 min. | 5 min. |
| Comparative Polyolefin Example 9 | None | 0.00 | 1.00 | 5.00 | | |
| Comparative Polyolefin Example 10 | TYRIN 7100 | 0.00 | 0.75 | 2.00 | 5.00 | |
| Comparative Polyolefin Example 11 | LMA-1 | 0.00 | 0.50 | 5.00 | | |
| Inventive Sag Resistant Polyolefin Ex. 14 | 70 CPE-g-30 SMA | 0.00 | 0.75 | 2.25 | 5.00 | |
| Inventive Sag Resistant Polyolefin Ex. 15 | 50 CPE-g-49.975 SMA (0.0025 ALMA) | 0.00 | 0.50 | 1.50 | 2.25 | 3.50 |
| Inventive Sag Resistant Polyolefin Ex. 16 | 20 CPE-g-80 SMA | 0.00 | 0.50 | 1.00 | 1.50 | 2.50 |

Certain CPO-g-MAs were also tested as an additive in a propylene homopolymer, L5D45G, which is commercially available from The Dow Chemical Company. The additives were added at 5 wt % based on total polymer weight and the sag testing results are shown in Table 6.

TABLE 6

| | | Sag in Inches | | | | |
|---|---|---|---|---|---|---|
| Example | Additive | 1 min. | 2 min. | 3 min. | 4 min. | 5 min. |
| Comparative Polyolefin Example 12 | None | 0.00 | 0.50 | 1.25 | 2.00 | 4.00 |
| Comparative Polyolefin Example 13 | TYRIN 7100 | 0.00 | −0.13 | −0.25 | −0.50 | −0.75 |
| Comparative Polyolefin Example 14 | LMA-1 | 0.00 | 0.00 | −0.50 | −1.00 | −1.00 |
| Inventive Sag Resistant Polyolefin Ex. 17 | 70 CPE-g-30 SMA | 0.00 | 0.25 | 0.25 | 0.00 | 0.00 |
| Inventive Sag Resistant Polyolefin Ex. 18 | 50 CPE-g-50 SMA | 0.00 | −0.25 | −0.50 | −0.75 | −1.00 |

As can be seen in Table 6, CPE-g-SMA showed better sag resistance at both the 30 wt % and 50 wt % SMA levels in comparison to the propylene homopolymer in the absence of the additive.

Test Methods

Test methods include the following:

Polymer density is measured according to ASTM D792.

Melt Index, $I_2$, is measured according to ASTM D1238 (190° C./2.16 kg).

Sag Testing

Test strips with dimensions of 1 mm (0.04 inch)×0.5 inch×5 inches were suspended in a Blue M convection oven set to a temperature of 140° C. (for LLPDE) by clamping the top 0.5 inch of the specimen with a butterfly clip hanging from a steel rod. Adjacent to the test strip was a ruler graduated in inches set so the bottom of the test strip corresponded to the zero inch mark of the ruler (with downward being the positive direction). A stopwatch was used to measure the elongation (sag) of the test strip by observation through the sight glass on the oven door. The data recorded was elongation vs. time. In the case of HDPE a 14 gram weight was clamped to the bottom of the test strip and the oven set temperature was 160° C. The hanging weight was simply a butterfly clip with a weight of 14 grams and was attached to the bottom 0.5 inch of the test specimen.

The present invention may be embodied in other forms without departing from the spirit and the essential attributes thereof, and, accordingly, reference should be made to the appended claims, rather than to the foregoing specification, as indicating the scope of the invention.

We claim:

1. A polyolefin composition comprising a polymer blend comprising one or more polyolefins and from 1 to 5 percent by weight of a polyolefin additive comprising chlorinated polyolefin grafted with an alkyl (meth)acrylate, wherein the alkyl has greater than 10 carbon atoms and wherein the alkyl of the alkyl (meth)acrylate is selected from the group consisting of stearyl, lauryl, and combinations thereof.

2. The polyolefin composition according to claim 1, wherein the chlorinated polyolefin is chlorinated polyethylene.

3. The polyolefin composition according to claim 1, wherein the chlorinated polyolefin grafted with an alkyl (meth)acrylate is selected from the group consisting of lauryl methacrylate grafted chlorinated polyethylene, stearyl methacrylate grafted chlorinated polyethylene, and combinations thereof.

4. The polyolefin composition according to claim 1, wherein the chlorinated polyolefin grafted with an alkyl (meth)acrylate comprises from 40 to 60 wt % chlorinated polyolefin and from 40 to 60 wt % alkyl (meth) acrylate.

5. A method of improving the sag resistance of an olefin-based polymer comprising:
adding from 1 to 5 wt % chlorinated polyolefin grafted with an alkyl (meth)acrylate to one or more polyolefins, wherein the alkyl of the alkyl (meth)acrylate is selected from the group consisting of stearyl, lauryl, and combinations thereof.

6. The method according to claim 5, wherein the one or more polyolefins are selected from the group consisting of polypropylene, high density polyethylene, and linear low density polyethylene.

7. The method according to claim 5, wherein the chlorinated polyolefin is chlorinated polyethylene.

8. The method according to claim 5, wherein the chlorinated polyolefin grafted with an alkyl (meth)acrylate is selected from the group consisting of lauryl methacrylate grafted chlorinated polyethylene, stearyl methacrylate grated chlorinated polyethylene, and combinations thereof.

9. The method according to claim 5, wherein the chlorinated polyolefin grafted with an alkyl (meth)acrylate comprises from 40 to 60 wt % chlorinated polyolefin and from 40 to 60 wt % alkyl (meth) acrylate.

10. A sag resistant polyolefin composition comprising:
one or more polyolefins; and
from 1 to 5 wt % chlorinated polyolefin grafted with an alkyl (meth)acrylate, wherein the alkyl has greater than 10 carbon atoms, and wherein the alkyl of the alkyl (meth)acrylate is selected from the group consisting of stearyl, lauryl, and combinations thereof.

11. The sag resistant polyolefin according to claim 10, wherein the one or more polyolefins is selected from the group consisting of polypropylene, high density polyethylene, and linear low density polyethylene.

12. The sag resistant polyolefin according to claim 10, wherein the chlorinated polyolefin is chlorinated polyethylene.

13. The sag resistant polyolefin according to claim 10, wherein the chlorinated polyolefin grafted with an alkyl (meth)acrylate is selected from the group consisting of lauryl methacrylate grafted chlorinated polyethylene, stearyl methacrylate grated chlorinated polyethylene, and combinations thereof.

14. The sag resistant polyolefin according to claim 10, wherein the chlorinated polyolefin grafted with an alkyl (meth)acrylate comprises from 40 to 60 wt % chlorinated polyolefin and from 40 to 60 wt % alkyl (meth) acrylate.

15. The sag resistant polyolefin according to claim 10, wherein a milled and molded test strip produced from the sag resistant polyolefin exhibits a sag resistance greater than that exhibited by the one or more polyolefins in the absence of the chlorinated polyolefin grafted with an alkyl (meth) acrylate.

\* \* \* \* \*